(12) United States Patent
Henzler et al.

(10) Patent No.: US 10,549,800 B2
(45) Date of Patent: Feb. 4, 2020

(54) STABILIZATION APPARATUS FOR A TWO-WHEELED VEHICLE

(71) Applicant: Robert Bosch GmbH, Stuttgart (DE)

(72) Inventors: Markus Henzler, Stuttgart (DE); Matthias Klews, Tuebingen (DE)

(73) Assignee: Robert Bosch GmbH, Stuttgart (DE)

( * ) Notice: Subject to any disclaimer, the term of this patent is extended or adjusted under 35 U.S.C. 154(b) by 124 days.

(21) Appl. No.: 15/749,192

(22) PCT Filed: Jun. 21, 2016

(86) PCT No.: PCT/EP2016/064254
§ 371 (c)(1),
(2) Date: Jan. 31, 2018

(87) PCT Pub. No.: WO2017/028999
PCT Pub. Date: Feb. 23, 2017

(65) Prior Publication Data
US 2018/0229789 A1 Aug. 16, 2018

(30) Foreign Application Priority Data

Aug. 14, 2015 (DE) .......................... 10 2015 215 524

(51) Int. Cl.
| | |
|---|---|
| *B62H 1/10* | (2006.01) |
| *B62J 99/00* | (2009.01) |
| *B62K 11/00* | (2006.01) |

(52) U.S. Cl.
CPC ............... *B62H 1/10* (2013.01); *B62J 99/00* (2013.01); *B62K 11/00* (2013.01); *B60Y 2300/02* (2013.01); *B62J 2099/002* (2013.01); *B62J 2099/004* (2013.01); *B62J 2099/0013* (2013.01)

(58) Field of Classification Search
CPC ...................................................... B62D 37/06
See application file for complete search history.

(56) References Cited

U.S. PATENT DOCUMENTS

| | | | | |
|---|---|---|---|---|
| 3,465,840 | A * | 9/1969 | Summers | B62D 37/06 180/209 |
| 3,900,076 | A * | 8/1975 | Winfrey | B62D 37/06 180/8.6 |
| 5,960,900 | A * | 10/1999 | Cheng | B62D 37/06 180/165 |
| 9,718,504 | B2 * | 8/2017 | Klews | B62D 37/06 |

(Continued)

FOREIGN PATENT DOCUMENTS

| | | |
|---|---|---|
| CN | 101287646 A | 10/2008 |
| CN | 202728379 U | 2/2013 |
| CN | 203199113 U | 9/2013 |

(Continued)

OTHER PUBLICATIONS

International Search Report dated Sep. 7, 2016, of the corresponding International Application PCT/EP2016/064254 filed Jun. 21, 2016.

*Primary Examiner* — Kevin Hurley

(74) *Attorney, Agent, or Firm* — Norton Rose Fulbright US LLP; Gerard A. Messina

(57) ABSTRACT

A stabilization apparatus for a two-wheeled vehicle includes a rotationally mounted gyroscope and a drive unit, as well as a rotational-direction reversal unit disposed between the drive unit and the gyroscope.

16 Claims, 1 Drawing Sheet

(56) References Cited

U.S. PATENT DOCUMENTS

2006/0289252 A1    12/2006   Spina
2011/0163516 A1     7/2011   Whinnery

FOREIGN PATENT DOCUMENTS

| DE | 102013200020 A1 | 7/2014 |
|----|-----------------|--------|
| GB | 2465020 A       | 5/2010 |
| JP | H06174473 A     | 6/1994 |
| JP | 2007185761 A    | 7/2007 |
| JP | 2014069672 A    | 4/2014 |
| JP | 2015129691 A    | 7/2015 |
| WO | 2013130656 A1   | 9/2013 |

\* cited by examiner

STABILIZATION APPARATUS FOR A TWO-WHEELED VEHICLE

FIELD

The present invention relates to a stabilization apparatus for a two-wheeled vehicle.

BACKGROUND INFORMATION

German Patent No. DE 10 2013 200 020 A1 describes a stabilization apparatus for a motorized two-wheeled vehicle that has two side-by-side gyroscopes with parallel spin axes, the gyroscopes having the ability to be tilted in a coupled movement for the stabilization function. The two gyroscopes are driven permanently in opposite directions of rotation by electric motors, and in non-critical driving conditions, are aligned with their spin axes parallel to the longitudinal axis of the vehicle. If the two-wheeled vehicle gets into a critical driving condition, then both gyroscopes are tilted in opposite direction, so that a stabilizing angular momentum builds up in the gyroscopes. After the driving situation has stabilized, the gyroscope spin axes are swung back into their initial position again, in order to ensure that no resulting angular momentum acts on the two-wheeled vehicle during regular travel.

SUMMARY

The stabilization apparatus according to the present invention may be used in two-wheeled vehicles, particularly in motorized two-wheeled vehicles, in order to stabilize the two-wheeled vehicle, especially in critical driving situations. The stabilization apparatus includes a rotationally mounted gyroscope, whose rotational movement generates an angular momentum that acts in stabilizing fashion on the vehicle. Driving situations that are unstable or becoming unstable are able to be stabilized with the aid of the stabilization apparatus according to the present invention, so that the danger of an accident, especially during cornering of the two-wheeled vehicle, is reduced significantly.

In addition, the stabilization apparatus includes a drive unit, by which the gyroscope is able to be driven about its spin axis, as well as a rotational-direction reversal unit that is disposed between the drive unit and the gyroscope and via which the direction of rotation of the gyroscope is able to be adjusted. For example, the drive unit takes the form of an energy store, whose energy is transmittable via the rotational-direction reversal unit to the gyroscope in order to generate the gyroscopic rotational movement.

This embodiment has the advantage that the stabilizing direction is adjustable via the rotational-direction reversal unit without having to impress a tilting or swiveling motion on the gyroscope, with a change in the spin axis. The stabilizing angular momentum of the gyroscope is a function of the direction of rotation, so that in left-hand curves and in right-hand curves, by opposite directions of rotation of the gyroscope, correspondingly opposite angular momentums are able to be generated, which have a stabilizing effect on the two-wheeled vehicle.

In one advantageous embodiment, the gyroscope has a non-adjustable spin axis in the two-wheeled vehicle. This implementation may be realized using simple structural measures, since no costly kinematic devices are needed for tilting or swiveling the gyroscope to change the position of the gyroscope spin axis. Preferably, the stabilization direction is given solely via the direction of rotation of the gyroscope.

In an alternative implementation, in addition to the possibility of reversing the rotational direction of the gyroscope, the stabilization apparatus also has a device for tilting or swiveling the gyroscope, with which the gyroscope spin axis may be tilted or deviated in relation to the two-wheeled vehicle's own coordinate system. An additional influencing possibility is thereby available for stabilizing the two-wheeled vehicle with the aid of the stabilization apparatus. By tilting or swiveling the gyroscope, in principle, the gyroscope spin axis is able to assume any position in the two-wheeled vehicle.

The stabilization apparatus having the gyroscope, the drive unit and the rotational-direction reversal unit may form one cohesive modular unit that is installed in the two-wheeled vehicle and is joined to the frame of the two-wheeled vehicle, for example. In the implementation of the gyroscope with non-adjustable spin axis, the gyroscope is rotationally mounted in the stabilization apparatus, so that after the stabilization apparatus has been permanently installed in the two-wheeled vehicle, the gyroscope also has a non-adjustable spin axis relative to the two-wheeled vehicle.

According to one advantageous embodiment, the rotational-direction reversal unit takes the form of a switchable gear unit. The drive movement of the drive unit is transmitted via the gear unit to the gyroscope, the direction of rotation of the gyroscope being a function of the switching direction of the gear unit, and being able to be reversed by switching over the gear unit. If need be, a change of speed may be achieved via the gear unit, in the sense of a speed-reducing ratio or speed-increasing ratio between the drive unit and the gyroscope.

According to a further useful embodiment, the drive unit is realized as a mechanical energy store, e.g., as a spiral spring. In particular, the mechanical energy store is permanently preloaded, in order to rotationally drive the gyroscope in a short time, if necessary. Generally, the gyroscope is advantageously in a state of rest and is set into rotation via the drive unit and the rotational-direction reversal unit only in the event of a critical or nearly critical driving condition of the two-wheeled vehicle. Particularly in the implementation as a mechanical energy store, the drive unit may have sufficiently high energy content to sharply accelerate the gyroscope from the state of rest and to impress a minimum rotational speed which is necessary for stabilizing the two-wheeled vehicle.

According to a further expedient embodiment, the drive unit includes an electric motor via which, especially in the implementation of the drive unit as a mechanical energy store, the drive energy may be replenished to a setpoint value. If the gyroscope is driven via the drive unit in order to stabilize the two-wheeled vehicle, so that the energy store of the drive unit is exhausted, the drive unit may subsequently be loaded with stored energy again via the electric motor.

In an alternative embodiment, the electric motor represents the drive unit, the drive movement of the electric motor being transmitted via the rotational-direction reversal unit to the gyroscope.

According to a further useful embodiment, the stabilization apparatus includes a braking device, via which the gyroscope is able to be braked. The gyroscope may be fixed in position in the state of rest by the braking device, so that the gyroscope is prevented from rotating. In addition, it is possible to brake the rotating gyroscope. This embodiment makes it possible for the gyroscope to be held in a state of rest by the braking device in driving situations not critical with regard to safety, and in driving situations that are critical or nearly critical with regard to safety, for the braking device to release the gyroscope, so that the gyroscope is rotationally driven via the drive unit and the rotational-direction reversal unit.

In a further embodiment, located in the transmission path between the drive unit and the gyroscope is a coupling that is adjustable between an open state and a closed, movement-transmitting state. In situations not critical with regard to safety, the coupling is open, so that the transmission path to the gyroscope is interrupted and the drive movement is not transmitted to the gyroscope. In situations critical in terms of safety, the coupling is closed in order to permit the desired transmission of the drive energy to the gyroscope. The coupling is located either between the drive unit and the rotational-direction reversal unit or between the rotational-direction reversal unit and the gyroscope.

According to another useful implementation, the stabilization apparatus is used for yaw stabilization in order, namely, to prevent an accident of the two-wheeled vehicle because of skidding of the rear wheel. For yaw stabilization, it is expedient that the spin axis of the gyroscope coincides or at least approximately coincides with the vertical axis of the two-wheeled vehicle. This implementation is suitable especially for a stabilization apparatus having a non-adjustable spin axis of the gyroscope.

In another embodiment which likewise is suitable for stabilization apparatuses with non-adjustable spin axis of the gyroscope, the spin axis of the gyroscope forms a larger angle with the vertical axis of the two-wheeled vehicle, which, for instance, is at least 45°, may possibly also be 90°, and is aligned parallel to the longitudinal axis of the vehicle, for example. This embodiment permits roll stabilization of the two-wheeled vehicle with a righting moment acting about the longitudinal axis of the two-wheeled vehicle.

According to a further expedient embodiment, the stabilization apparatus has exactly one gyroscope. In principle, this is sufficient to achieve the desired stabilization of the two-wheeled vehicle. The stabilization direction may be influenced by the rotational-direction reversal unit.

In an alternative implementation, the stabilization apparatus has more than one gyroscope, e.g., two gyroscopes, which preferably are aligned parallel to each other and, in particular, have a non-adjustable spin axis. Each gyroscope is able to be driven via a drive unit and a rotational-direction reversal unit. If need be, the gyroscopes have one shared drive unit and one shared rotational-direction reversal unit.

The various adjustable components of the stabilization apparatus, especially the rotational-direction reversal unit and possibly the braking device and the electric motor which is assigned to the drive unit, are adjusted via control signals of a regulating or control unit. The regulating or control unit may be part of the stabilization apparatus. Alternatively, it is a regulating or control unit of the two-wheeled vehicle, to which the adjustable components of the stabilization apparatus are connected.

According to a further useful embodiment, the components of the stabilization apparatus are adjusted on the basis of sensor information with respect to driving-condition variables of the two-wheeled vehicle. In particular, the sensor information is ascertained in a vehicle sensor system, e.g., an inertial sensor system and one or more wheel-speed sensors, via which the sought driving-condition variables are sensed. The sensor data are processed in the regulating or control unit in which the control signals are generated for controlling the components of the stabilization apparatus.

In the case of the method for operating the two-wheeled vehicle, driving-condition variables are ascertained and evaluated continuously, in order to detect critical driving conditions. In this case, control signals are generated for controlling the adjustable components of the stabilization apparatus, while drive energy is conducted from the drive unit via the rotational-direction reversal unit to the stationary gyroscope, which is thereby driven in the desired direction of rotation, so that the angular momentum stabilizing the vehicle is generated.

Further advantages and useful embodiments are described herein and are shown in the figures.

BRIEF DESCRIPTION OF THE DRAWINGS

In the figures, identical components are provided with identical reference numerals.

DETAILED DESCRIPTION OF EXAMPLE EMBODIMENTS

Figure 1:
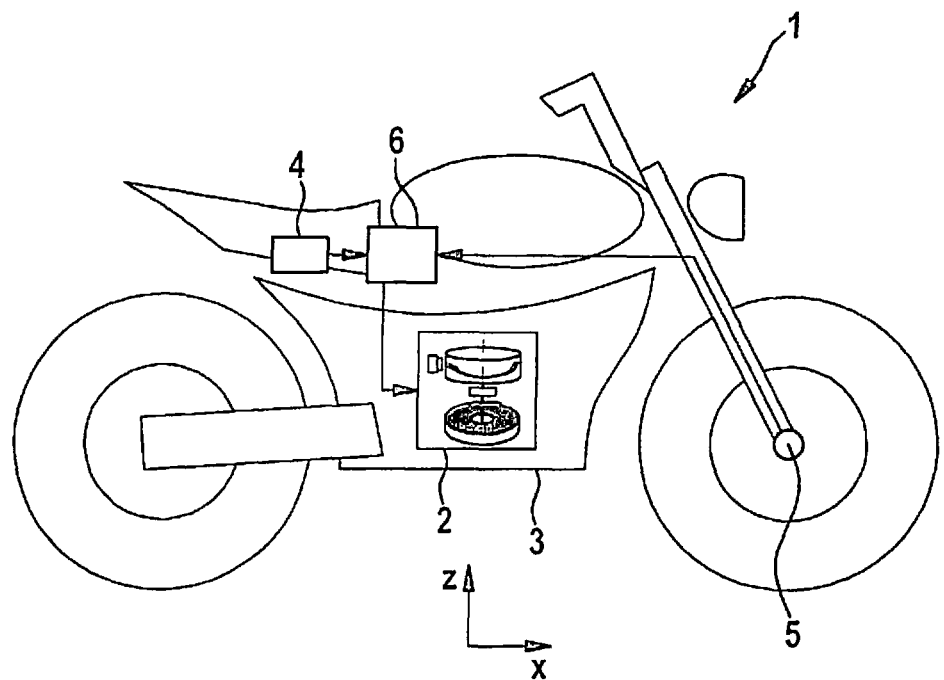
FIG. 1 shows a schematic view of a motorized two-wheeled vehicle, which is equipped with a stabilization apparatus.
Figure 2:
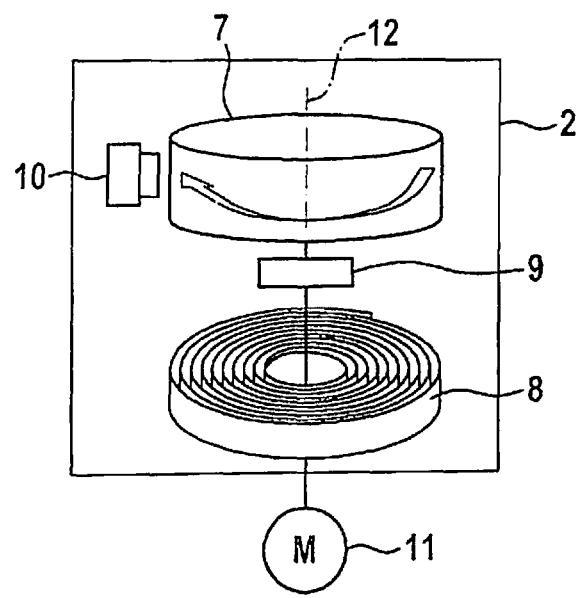
FIG. 2 shows the stabilization apparatus in an enlarged representation.

FIG. 1 shows a motorized two-wheeled vehicle 1 that is equipped with a stabilization apparatus 2 which is shown enlarged in FIG. 2. Stabilization apparatus 2 is used to stabilize two-wheeled vehicle 1 in critical driving conditions, particularly during cornering and in response to the imminent danger of a lateral skidding of the rear wheel of the two-wheeled vehicle. Stabilization apparatus 2 is secured to frame 3 of the two-wheeled vehicle and preferably forms a prefabricated modular unit which is integrated into two-wheeled vehicle 1.

Two-wheeled vehicle 1 is equipped in a conventional manner with sensors that include an inertial sensor system 4 as well as at least one wheel-speed sensor 5 at the front wheel. Sensors 4, 5 detect driving-condition variables, from which the driving condition may be inferred. By evaluating the driving-condition variables, it is possible to infer a critical or an imminent critical driving condition.

Two-wheeled vehicle 1 is equipped with a regulating or control unit 6, to which the sensor signals from sensors 4, 5 are supplied as input variables. In the regulating or control unit, control signals are generated, which are supplied to stabilization apparatus 2 for controlling the adjustable components.

As can be gathered from FIG. 1 in conjunction with FIG. 2, stabilization apparatus 2 includes a gyroscope 7, a drive unit 8 and a rotational-direction reversal unit 9. In addition, a braking device 10 and an electric motor 11 are part of stabilization apparatus 2. Gyroscope 7 exhibits a high moment of inertia and is mounted in the stabilization apparatus in a manner allowing it to rotate about its spin axis 12; no further movement possibility exists for gyroscope 7, in particular, it is mounted in a manner not allowing it to swivel or tilt. In the installed state of stabilization apparatus 2 in two-wheeled vehicle 1, spin axis 12 of gyroscope 7 runs parallel or at least approximately parallel to vertical axis z of the two-wheeled vehicle.

Drive unit 8 is implemented as a mechanical energy store in the form of a spiral spring. Spiral spring 8 is tensioned via an actuation of electric motor 11, electric motor 11 only having to be actuated for the tensioning process. Tensioned spiral spring 8 maintains its energy state until the spring energy is converted for the rotational driving of gyroscope 7.

Spiral spring 8 is connected to gyroscope 7 via rotational-direction reversal unit 9. For example, rotational-direction reversal unit 9 is implemented as a switchable gear unit that converts the spring energy of spiral spring 8 into a rotational movement of gyroscope 7 about its spin axis 12. The direction of rotation of gyroscope 7 may be set clockwise or counterclockwise via rotational-direction reversal unit 9.

Braking device 10 is adjustable between a position braking the rotational movement of gyroscope 7, and a release position in which gyroscope 7 is able to rotate unbraked.

All adjustable components of stabilization apparatus 2 are adjusted by control signals of regulating or control unit 6 in two-wheeled vehicle 1; this pertains to rotational-direction reversal unit 9, braking device 10 as well as electric motor 11.

The example method for stabilizing the two-wheeled vehicle proceeds as follows:

Sensor signals are ascertained continuously via sensors 4, 5 and supplied as input signals to regulating or control unit 6, in which it is calculated whether a driving condition critical with regard to safety exists or threatens. If this is the case, control signals are generated for controlling the adjustable components of stabilization apparatus 2.

So long as two-wheeled vehicle 1 is in a condition not critical in terms of safety, braking device 10 of stabilization apparatus 2 is in its position braking the rotational movement of the gyroscope; at the same time, spiral spring 8 is in its tensioned state. If stabilization apparatus 2 is to be actuated to stabilize the two-wheeled vehicle, then braking device 10 is released, so that gyroscope 7 is able to rotate unhindered. Meantime, rotational-direction reversal unit 9 is controlled in order to adjust the desired direction of rotation of gyroscope 7 about spin axis 12. Spring energy is conducted from tensioned spiral spring 8 via rotational-direction reversal unit 9 to gyroscope 7, which begins to rotate in the desired direction of rotation. The angular momentum thereby generated leads to stabilization of the two-wheeled vehicle.

After the two-wheeled vehicle has been stabilized, braking device 10 may be transferred again into its braking position, in which rotation of gyroscope 7 about its spin axis 12 is prevented. At the same time, electric motor 11 may be actuated, in order to tension spiral spring 8 again.

What is claimed is:

1. A stabilization apparatus for a two-wheeled vehicle, comprising:
    a rotationally mounted gyroscope;
    a drive unit, wherein the drive unit is configured to drive the gyroscope; and
    a rotational-direction reversal unit, wherein the rotational-direction reversal unit is configured to adjust a direction of rotation of the gyroscope;
    wherein:
        the rotational-direction reversal unit is disposed between the drive unit and the gyroscope;
        the rotational-direction reversal unit is a switchable gear unit;
        the drive unit is a mechanical energy store or includes an electric motor;
        the gyroscope is configured to be braked via a braking device;
        a spin axis of the gyroscope is non-adjustable relative to the two-wheeled vehicle;
        the spin axis of the gyroscope is angularly offset from spin axes of both wheels of the two-wheeled vehicle; and/or
        the stabilization apparatus has exactly one gyroscope.

2. The stabilization apparatus as recited in claim 1, wherein the rotational-direction reversal unit is the switchable gear unit.

3. The stabilization apparatus as recited in claim 1, wherein the drive unit is the mechanical energy store.

4. The stabilization apparatus as recited in claim 3, wherein the drive unit is a spiral spring.

5. The stabilization apparatus as recited in claim 1, wherein the drive unit includes the electric motor.

6. The stabilization apparatus as recited in claim 1, wherein the stabilization apparatus comprises the braking device.

7. The stabilization apparatus as recited in claim 1, wherein the spin axis of the gyroscope is non-adjustable relative to the two-wheeled vehicle.

8. The stabilization apparatus as recited in claim 1, wherein the stabilization apparatus has exactly one gyroscope.

9. The stabilization apparatus as recited in claim 1, wherein the rotational-direction reversal unit is disposed between the drive unit and the gyroscope.

10. The stabilization apparatus as recited in claim 9, wherein the drive unit is configured to output power, and the rotational-direction reversal unit is configured to supply the power output by the drive unit to the gyroscope to power the rotation of the gyroscope in the direction which the rotational-direction reversal unit is configured to adjust.

11. The stabilization apparatus as recited in claim 1, wherein the drive unit is configured to output power, and the rotational-direction reversal unit is configured to supply the power output by the drive unit to the gyroscope to power the rotation of the gyroscope in the direction which the rotational-direction reversal unit is configured to adjust.

12. The stabilization apparatus as recited in claim 1, wherein the spin axis of the gyroscope is angularly offset from the spin axes of both wheels of the two-wheeled vehicle.

13. The stabilization apparatus as recited in claim 12, wherein the spin axis of the gyroscope coincides at least approximately with a vertical axis of the two-wheeled vehicle.

14. The stabilization apparatus as recited in claim 13, wherein the stabilization apparatus is usable for yaw stabilization of the two-wheeled vehicle.

15. A regulating or control unit for controlling adjustable components of a stabilization apparatus, the stabilization apparatus including:
    a rotationally mounted gyroscope;
    a drive unit, wherein the drive unit is configured to drive the gyroscope; and
    a rotational-direction reversal unit, wherein the rotational-direction reversal unit is configured to adjust a direction of rotation of the gyroscope;
    wherein:
        the rotational-direction reversal unit is disposed between the drive unit and the gyroscope;
        the rotational-direction reversal unit is a switchable gear unit;
        the drive unit is a mechanical energy store or includes an electric motor;
        the gyroscope is configured to be braked via a braking device;

a spin axis of the gyroscope is non-adjustable relative to the two-wheeled vehicle;

the spin axis of the gyroscope is angularly offset from spin axes of both wheels of the two-wheeled vehicle; and/or the stabilization apparatus has exactly one gyroscope.

16. A two-wheeled vehicle, comprising:

a stabilization apparatus including:
- a rotationally mounted gyroscope;
- a drive unit, wherein the drive unit is configured to drive the gyroscope; and
- a rotational-direction reversal unit, wherein the rotational-direction reversal unit is configured to adjust a direction of rotation of the gyroscope;

a regulating or control unit; and a vehicle sensor system;

wherein:
control signals for controlling adjustable components of the stabilization apparatus are able to be generated in the regulating or control unit from driving-condition variables ascertained in the vehicle sensor system; and the rotational-direction reversal unit is disposed between the drive unit and the gyroscope, the rotational-direction reversal unit is a switchable gear unit, the drive unit is a mechanical energy store or includes an electric motor, the gyroscope is configured to be braked via a braking device, a spin axis of the gyroscope is non-adjustable relative to the two-wheeled vehicle, the spin axis of the gyroscope is angularly offset from spin axes of both wheels of the two-wheeled vehicle, and/or the stabilization apparatus has exactly one gyroscope.

* * * * *